Aug. 27, 1968

R. L. PILLOTON 3,398,718

FLUIDIZED-BED COATING APPARATUS

Filed March 10, 1965

INVENTOR.
Roger L. Pilloton
BY
ATTORNEY.

United States Patent Office 3,398,718
Patented Aug. 27, 1968

3,398,718
FLUIDIZED-BED COATING APPARATUS
Roger L. Pilloton, Oak Ridge, Tenn., assignor to the United States of America as represented by the United States Atomic Energy Commission
Filed Mar. 10, 1965, Ser. No. 438,800
1 Claim. (Cl. 118—48)

This invention relates generally to gas-solid contactors or reactors and more particularly to an improved fluidized bed reactor.

Fluidized-bed contactors or reactors have, heretofore, been widely used in chemical process industries. For example such contactors have found high utility in the petroleum industry as catalytic crackers and in the manufacture of sulfuric acid from $SO_2$. Recently, these contactors have found widespread utility in the nuclear field, employed primarily as apparatus for applying a coating of a suitable material such as pyrolytic carbon on fuel particles such as uranium carbide, thorium carbide, uranium oxide, thorium oxide or mixtures thereof. Generally, this coating method consists of suspending the particles to be coated within a heated, vertical reactor which is typically about a 3–4 inch diameter column, by the upward flow of an inert gas such as helium or argon. A thermally-decomposable gas such as methane or acetylene is mixed with the inert gas prior to entering the heated reactor and the products of the subsequent cracking of the hydrocarbon gas provides the coating for the fuel particles. In order to fully realize the excellent potential of these coated fuel particles as reactor fuels, it is necessary that the coatings deposited upon the particles be of a uniform nature.

In carrying out such coating operations, conventional contactors have experienced a number of difficulties which adversely affect the uniformity of the coatings. Foremost of these difficulties is the non-uniform particle movement experienced within the contactor during the coating operation. A second problem encountered with conventional type contactors is formation of bubbles within the contactor during coating; this makes good gas-solid contact difficult to achieve, resulting in carbon being deposited on the walls of the contactor, and the overall carbon deposition efficiency low (~50%).

Previous attempts to alleviate these problems have generally been directed toward providing a gas distributor which provides a uniform distribution of the incoming gas while minimizing bubble formation. These gas distributors have not been altogether successful in eliminating these problems in conventional contactors. Furthermore most conventional fluidized-bed contactors are not readily adapted to scale-up due to size restrictions of the gas distributors. With the advent of large diameter contactors, which will be required to process kilogram quantities of coated particles on a routine basis, it is highly desirable to provide a contactor which, not only will accommodate such large quantities of coated particles, but will also have a higher efficiency than those previously employed and provide uniformly coated fuel particles.

Accordingly, it is a general object of this invention to provide a gas-solid contactor for fluidizing discrete small diameter particles.

Another object is to provide an improved fluidized-bed contactor for coating nuclear fuel particles with a material such as pyrolytic carbon.

A further object is to provide a fluidized-bed contactor for coating nuclear fuel particles within a particle size range of from 100–500 microns at elevated temperatures.

A still further object is to provide a fluidized-bed contactor having a novel gas distributor which provides for a more efficient utilization of the gas for fluidizing solid particles and at the same time provides for a more efficient and uniform coating of such particles than prior art contactors.

These and other objects, which will be apparent to those skilled in the art, are accomplished by providing a novel gas distributor for a gas-solid contactor comprising an apertured face plate which is of substantially conical section and has an included angle between 100°–150° and associated means for effecting a partitioning of an incoming coating gas such that a minor portion of the gas is passed upwardly through a central aperture of the faceplate while the remainder is passed upwardly through the peripheral apertures of the faceplate, the combined gas velocities of the partitioned gas streams being sufficient to maintain the therein contained solid particles in motion. Applicants have found that fluidizing operations carried out in their novel apparatus resulted in more efficient utilization of the coating gases with a higher percentage of the coated particles being acceptable, i.e., having a uniform coating thereon, than conventional fluidized-bed contactors. These striking results are generally attributable to the high degree of uniform distribution of the coating gas within the contactor which afforded a smooth and continuous movement of the solid particles throughout the contactor with minimal bubble formation within the contactor during the coating operation. Additionally, the present apparatus is ideally suited to scale-up to large diameter, production size contactors presently contemplated for handling kilogram quantities, on a routine basis and with the high efficiency and low maintenance demonstrated is amenable to handling recycle material remotely.

The herein described apparatus has been found to be highly suited to coating nuclear fuel particles, such as $UO_2$ (100–500 microns in diameter), with pyrolytic carbon. Whereas conventional contactors (3–4 inches in diameter) were found to be limited to about 2% hydrocarbon gas (such as methane) for high density impervious coating and had about 10% carry over, due to unsatisfactory coatings, the methane content could be increased to about 20% when the coating operation was carried out in applicant's process under comparable process conditions with essentially no carry over. The importance in achieving a higher methane content than previously attained in coating operations will be appreciated by those skilled in the art as being highly beneficial in reducing the coating time by as much as a factor of 10.

An understanding of this invention will be facilitated by reference to the following detailed description and the accompanying drawings, wherein.

Figure 1:
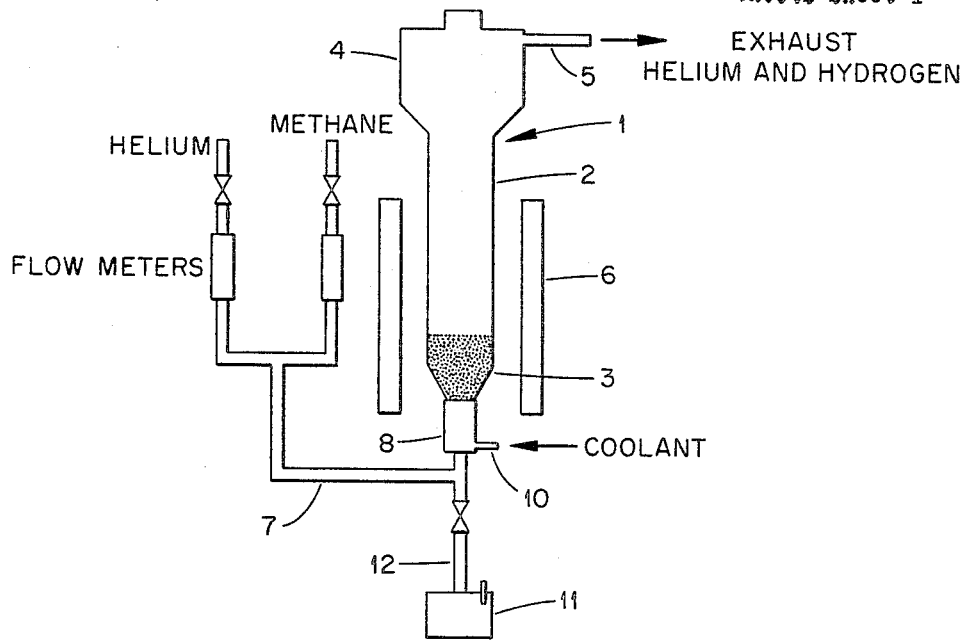
FIGURE 1 is a schematic diagram of a proposed fluidized-bed system incorporating the herein described novel gas distributor.
Figure 2:
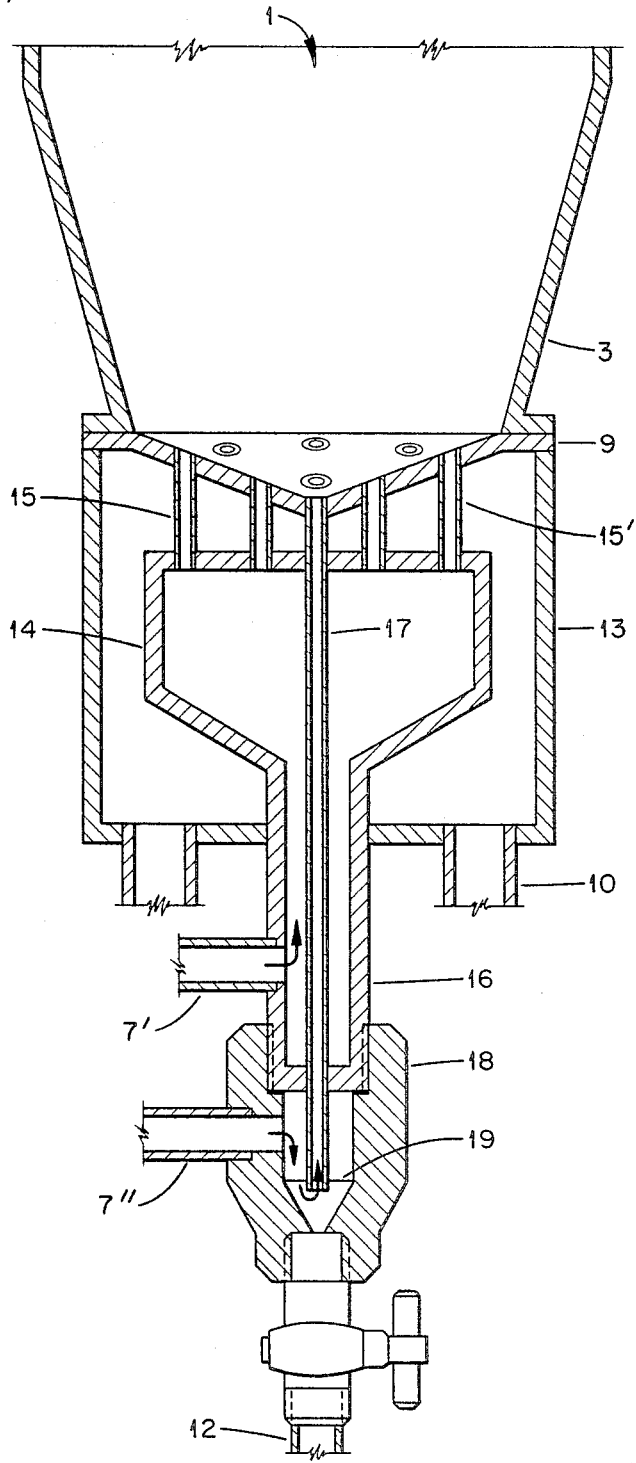
FIGURE 2 is an enlarged sectional view of the gas distributor and associated means for effecting a partitioning of the coating gas as it enters the contactor.

In the drawing FIGURE 1 illustrates an overall fluidizing system incorporating a preferred gas-solid contactor. The gas-solid contactor comprises a graphite reaction chamber 1 which consists of a major cylindrical section 2 and an inwardly tapered lower section 3. The reaction chamber 1 is adapted to receive in columnar fashion a mass of solid particles which form the fluidized bed. The upper end of chamber 1 forms a disentrainment chamber 4 which is provided to reduce carry over or entrainment losses through exit line 5. The bed particles are heated to the coating temperature by heater 6 which surrounds chamber 1. Heater 6 may be any conventional heater, such as resistance or induction heater, provided it has sufficient capacity to not only heat the bed particles to a selected coating temperature, but also to maintain the interior of chamber 1 at that coating temperature throughout the coating operation. The coating gas, which in a preferred embodiment herein disclosed, comprises methane and helium, enters chamber 1 by passing through conduit 7 and out through gas distributor 8 which with its associated gas feed system will be described in greater detail in FIGURE 2. It should be noted that the coating gas (as shown in FIGURE 2) enters the gas distributor by way of two separate streams (see conduits 7', 7") to effect a partitioned flow which will be discussed in greater detail hereinafter. The gas distributor broadly comprises, however, an apertured face plate substantially conical in section and integrally connected gas feed system for effecting a partitioned flow of coating gas therethrough into chamber 1. In order to prevent premature cracking of the coating gas before it passes into the contacting chamber, coolant is supplied to gas distributor and gas feed system through conduit 10. A particle storage receptacle 11 is positioned below the contactor. After the particles are coated, they are emptied from chamber 1 through conduit 12 which connects receptacle 11 with chamber 1. Conduit 12 is valved to maintain integrity of the gas feed system during the coating operation and as a control for removal of the particles to storage receptacle 11 after coating.

Referring now to FIGURE 2, there is shown an enlarged sectional view of the lower section of the contacting chamber 1 showing in detail the gas distributor and gas feed system. A housing 13 defining a plenum and having the apertured face plate 9 as an integral part thereof is sealably affixed to the lower tapered section 3 of chamber 1. The diameter of the face plate 9 is not critical to the practice of this invention, it being apparent that the overall diameter of the contactor, i.e., the diameter of cylindrical section 2 and the angle of taper of section 3 which may vary from 10° to 30° will dictate the diameter of the face plate. It has been found, however, that a ratio of face plate diameter to overall diameter of the column within the range of 0.4 to 0.7 is quite satisfactory. Additionally, the number of apertures comprised in face plate 9 is not critical, so long as the hereinafter disclosed partitioned flow of coating gas through face plate 9 into chamber 1 is maintained at a proper fluidizing velocity. It should be apparent that as the diameter of the column increases, resulting in a corresponding increase in the diameter of the face plate, additional peripheral apertures may be employed. A preferred embodiment of face plate 9 comprises a centrally disposed aperture in the apex of the cone-shaped face plate with equally spaced peripheral apertures on increasing concentric circles. For example, four peripheral apertures, equally spaced, on a circle of ¾ inch diameter with eight similarly spaced apertures on a circle of 1½ inches in diameter has been found to be quite satisfactory for a 3¼ inch diameter column. With respect to the diameters of the respective apertures, the particular size diameters employed in a given contactor system are known to those skilled in the art and for purposes of this invention the size employed in applicant's contactor is not critical. Typical aperture diameters which may be employed are ⅛ inch for the central aperture with 3/16 and 3/64 inch for the peripheral apertures, respectively.

The gas feed system comprises a gas manifold 14, which is disposed within housing 13 in spaced relationship from face plate 9, and a pluarlity of gas passageways 15, 15', . . . which connect the manifold with corresponding apertures in face plate 9. While these passageways may be aligned vertically, it has been found that if they are uniformly inclined (not shown in drawing) from the vertical axis of the contactor, preferably about 15°, this inclined relationship creates a slight rotational movement in the bed of particles, thereby enhancing the movement of the particles within the contacting chamber. Moreover, the passageways may be inclined slightly in a radial direction if desired, to further insure continuous movement of the particles. Coating gas is supplied to manifold 14 by conduit 7' which is connected to conduit 16 above its terminal end. A central gas passageway 17, communicating with corresponding centrally disposed aperture in face plate 9, extends through manifold 14 downwardly in concentric spaced relationship within conduit 16 and outwardly through the terminal end of conduit 16 into a reducer 18 which is sealably affixed to the terminal end of conduit 16. Coating gas is also supplied to central gas passageway 17 through conduit 7" which is connected to reducer 18 below the terminal end of conduit 16. It may thus be seen that, what is provided with this gas distributor system, is a method for effecting a partitioned gas flow of the coating gas into the contacting chamber wherein a portion is made to pass into the contacting chamber by way of the central aperture while the remainder passes through the peripheral apertures.

Figure 3:
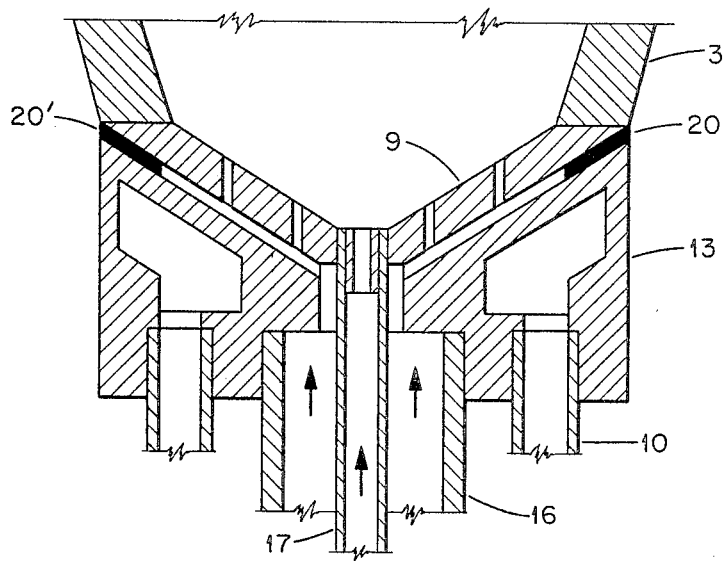
FIGURE 3 is an enlarged sectional view of an alternate embodiment of the gas distributor and associated gas feed system.

A modification in the gas distributor as shown in FIGURE 2 is depicted in FIGURE 3. As may be observed, in lieu of the gas manifold 14, a substantially conical shaped cavity, which may be bored in a massive block of metal such as copper is provided adjacent to face plate 9 and communicates with the lower tapered section 3 of the contacting chamber by way of multiple passageways machined in face plate 9. Central passageway 17, which is connected with inlet gas conduit 7" (not shown), communicates with the contacting chamber through the centrally disposed aperture in face plate 9. In this way, it may be seen that the hereinbefore discussed partitioned coating gas flow is achieved by passing one stream up through conduit 16, which is connected to gas inlet conduit 7' (not shown), into the aforementioned cavity and outwardly into the contacting chamber. Simultaneously therewith coating gas is passed up through passageway 17 and outwardly into the contacting chamber through the center aperture. In this embodiment coolant is supplied through conduit 10 to an annulus which is disposed adjacent to and in heat transfer relationship with the conical shaped gas cavity. It may thus be seen that this arrangement in like manner to the previously described embodiment for cooling the incoming coating gas to preclude premature cracking of the hydrocarbon gas before it reaches the contacting chamber. A partition (not shown) disposed within the annulus is provided to direct ingress and egress of coolant therethrough. The outer portion of the conical shaped cavity may be blocked off with plugs 20 and 21' to confine the flow of coating gas within the immediate area adjacent to the aforementioned passageways.

The modification shown in FIGURE 3 and described above provides for ease of fabrication and reduces the possibility of coolant leakage into the contacting chamber during coating operation. Additionally, thermal stresses which may be experienced during high temperature operation are reduced.

In carrying out the operation of this invention, solid particles, such as $UO_2$ particles, are charged into the contactor, substantially filling the lower tapered section and extending part-way up the cylindrical section. The bed of particles is brought up to the coating temperature; this may vary over a wide range depending upon the coating gas employed and, of course, must be greater than the decomposition temperature of the hydrocarbon gas in order to effect a cracking of the hydrocarbon gas to provide the coatings. During this period the bed particles are preferably fluidized with an inert gas such as helium. After the bed particles reach temperature the coating operation is initiated by passing a continuous stream of coating gas into the contacting chamber. For this it will be apparent that a number of coating gas compositions comprising a thermally decomposable hydrocarbon gas and generally an inert gas are suitable. For example a coating gas composition of methane and helium has been found to be quite satisfactory. Typically, the hydrocarbon composition consists of less than about 20% of the coating gas makeup. Applicants have found that a partitioned gas flow of the coating gas so as to effect a minor portion passing into the contactor through the central aperture with the remainder passing into the contactor through the peripheral apertures, greatly enhances the continuous movement of the particles. The amount of coating gas passing through the partitioned gas feed system may vary over a wide range. Applicants have found that a partitioned gas flow consisting of about 20% through the central aperture and about 80% through the peripheral apertures has been highly satisfactory, providing excellent movement of the particles within the contacting chamber, and is preferred. This design provides a convenient method for removing the coated particles after termination of the coating process to storage. This may be accomplished by stopping the upward flow of the coating gas through the central aperture, while maintaining gas flow through the peripheral apertures and at the same time opening the valve in the line connected to the particle receptacle below. In this way the coated particles will drop through the central passageway into the particle receptacle for storage. A screen 19 (see FIGURE 2) may be provided to preclude these particles from passing out through coating gas inlet 7".

The gas flow rate of the coating gas is not critical to the practice of this invention, except that a certain minimum gas velocity is required for fluidization. It is well known in the art that the minimum flow of fluidizing gas required to keep the particles suspended in a fluidized-bed depends upon a number of parameters, such as the nature of the coating gas, the temperature, the shape, diameter and density of the particles and the bed-voidage fraction at the point of minimum fluidization. In carrying out coating operations a single gas flow rate has, generally, been heretofore employed throughout the coating operation. Applicants have found, however, that certain improvements in coating characteristics are obtained by decreasing the minimum gas flow rate for a time and then increasing the flow rate as the coating diameters increase. This continuously changing gas flow rate was found necessary to maintain the desired degree of fluidization for producing a high quality coating. A complete discussion of the derivation and operation of this minimum gas flow rate for carrying out a coating operation may be seen in report ORNL-3639.

Operating temperatures for carrying out a coating process, such as coating $UO_2$ particles with pyrolytic carbon, are well known to those skilled in the art and will vary over a wide range, depending upon the hydrocarbon gas employed. For example, where a coating gas composition comprises about 20% methane-80% helium, coating temperatures between 1400°-2000° C. may be employed.

The particular size range of solid particles which may be accommodated in applicant's contactor may vary widely, providing that the particles are capable of being fluidized. This size range is well known in the art and typically ranges between 100-1000 microns, with a range between 100-500 microns being highly suited to a coating process by fluidization techniques.

Further illustration of the quantitative aspects and procedures of the present invention is provided in the following examples. Example I demonstrates the effect of varying the included angle of the face plate employed in applicant's contactor upon the wall velocity of the particles within the contacting chamber.

*Example I*

A fluidized bed apparatus was set up and tested as follows: a glass column (28″ x 3.25″ diameter) having a lower conical section with an included angle of 30° and a bottom opening of 2″ was loaded with 300 g. of quartz spherules having a size of 500-833 microns. An interchangeable gas distributor was sealably affixed to the bottom of the glass column and comprised a central gas feed line and a plenum for gas feed to peripheral apertures in a substantially conical section face plate. Each face plate had a central opening ⅛ inch in diameter, four ³⁄₆₄ inch in diameter holes spaced equally on a circle of ¾ inch diameter, and eight similar holes spaced equally on a circle 1½ inches in diameter.

Separate runs were made for different included angles of the face plate. Gas flow was partitioned so that 80% passed through the peripheral openings in the face plate and 20% through the central opening. Each plate was tested at three different total flow rates. The downward velocity of particles along the inner wall of the 30° conical section was determined for each test and the results are shown in the table below and graphically in FIGURE 3.

TABLE

| Flow Conditions, l./min. | | | Particle velocity, inches/sec. | | | | | | |
| --- | --- | --- | --- | --- | --- | --- | --- | --- | --- |
| Total Flow | Center Flow | Outer Flow | 180° | 165° | 150° | 135° | 120° | 90° | 60° |
| 90 | 16.2 | 73.8 | .250 | .133 | .333 | .400 | .571 | .666 | .250 |
| 101 | 18.7 | 82.3 | .500 | .333 | 1.000 | .900 | 1.110 | .400 | <.200 |
| 106.3 | 19.2 | 87.1 | .500 | .666 | .715 | 1.000 | 1.333 | .400 | .250 |

Figure 4:
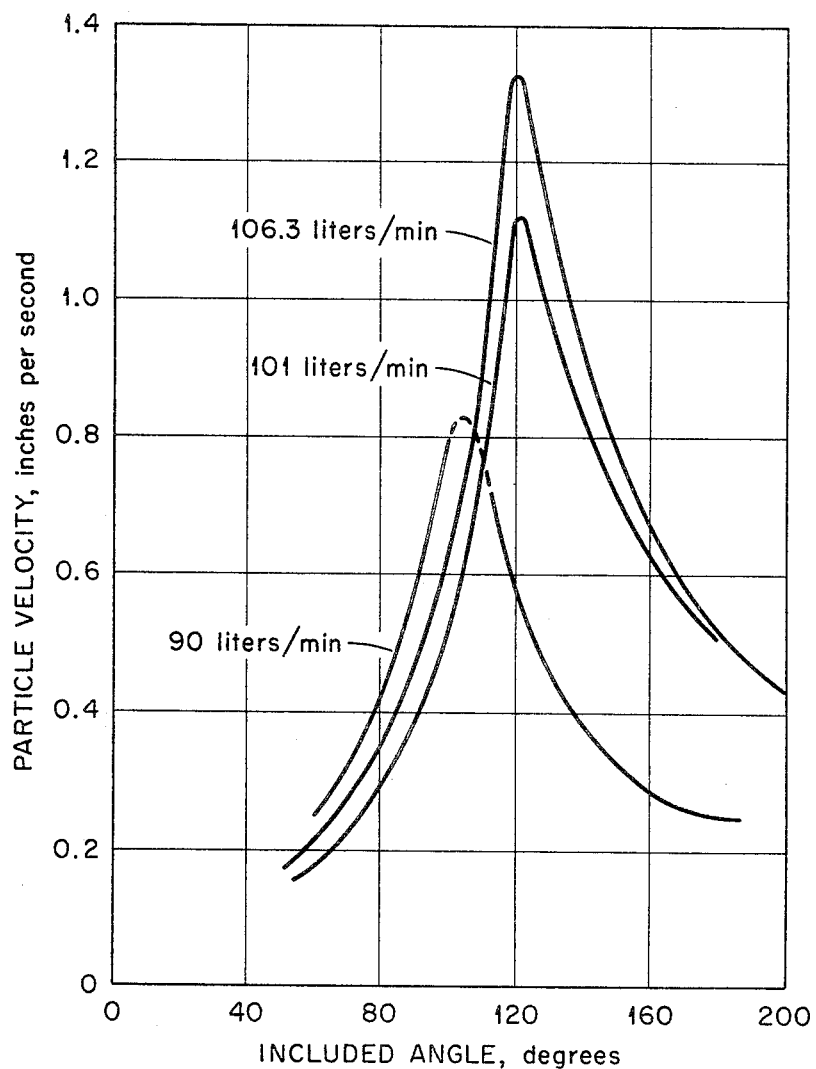
FIGURE 4 is a graph showing the observed relationship of the velocity of the bed particles as a function of the included angle in the conical gas distributor.

From the results shown in the above table and graphs in FIGURE 4, it may be seen that an included angle of the face plate of the gas distributor in the range of from about 100° to about 150°, with an angle of about 120° being preferred, provides improved movement, as measured by wall velocity of the particles, within the fluidized bed. Furthermore, for this range of included angles, minimal bubble formation was observed for the various total flow rates. This should be contrasted with prior art contactors wherein the movement of the particles within the contacting chamber was highly discontinuous, pulsing first in an upward direction and then downwardly, but generally never in a smooth continuous downward movement along the walls of the contacting chamber.

Example II demonstrates the applicability of applicant's contactor in coating $UO_2$ particles with pyrolytic carbon. It further illustrates a preferred method of carrying out such a coating operation.

*Example II*

A fluidized bed contactor was constructed as follows: a graphite reaction chamber (3″ diameter x 18″) having a lower conical section with an included angle of 30° and a bottom opening of 2″ was provided. A gas distributor of the type hereinbefore described was sealably affixed to the lower section of the reaction chamber and had an apertured face plate which had an included angle of 120°.

A 250 gram charge of thorium-uranium carbide particles having an average particle diameter of 250 microns was placed in the graphite reaction chamber. The bed of particles was then fluidized with helium and brought up to a temperature of about 1250° C.

After the bed reached temperature, the helium flow was switched to a gaseous reaction mixture of methane and helium. In accordance with the hereinbefore described partitioned flow design, the gaseous reaction mixture was partitioned so as to pass 20% of the total flow up through the central aperture with the remainder being passed up through the peripheral apertures. This partitioning of the coating gas was accomplished by having sources of methane and helium feed directly, after mixing, into each of the respective inlet lines which connect to the gas distributor. The respective gas flow rates were measured with flowmeters and were 1.5 l./min. for methane and 5.0 l./min. for helium.

The coating operation which was carried out at atmospheric pressure was continued for 30 minutes. The particle movement within the contacting chamber during the coating operation was observed and found to be smooth and continuous. This phase of the operation was then terminated and the particles removed and analyzed. Photomicrographs of the coated particles revealed that the particles had uniform coatings of approximately 100 microns thick.

It should be apparent to those skilled in the art that the smooth, continuous particle movement afforded with this novel design, provides for a more efficient coating process, and more importantly, a more uniform coating being deposited upon the solid particles, with less carry-over.

It is to be understood that the foregoing examples are merely illustrative and are not intended to limit the scope of this invention, but the invention should be limited only by the scope of the appended claim.

What is claimed is:

1. A gas-solid coating apparatus comprising: a contacting chamber adapted to hold a columnar bed of discrete solid particles; said chamber having a major portion comprising an upper cylindrical section and a tapered lower section; a downwardly directed substantially conical face plate having an included angle between 100 to 150; said face plate being apertured at its apex and having a plurality of apertures peripherally disposed thereabout; said face plate being joined at the periphery thereof to said tapered lower section, thereby forming a bottom for said contacting chamber; a terminal member including an upper plate portion closely spaced from and conically generally conforming to said face plate means connecting and enclosing the face plate and upper plate portion at the peripheral extents thereof whereby is formed a second chamber, said second chamber communicating with said contacting chamber through said peripherally disposed apertures; said upper plate portion comprising the upper wall of an annular chamber including fluid inlet and outlet means and being in a heat transfer relationship with said second chamber; a central gas passageway connected with the face plate at the centrally disposed aperture in said face plate and passing centrally through said annular chamber whereby is provided a gas-inlet and solids outlet for the contacting chamber; a conduit disposed concentrically about said central gas passageway and connected to the bottom wall of said annular chamber at a central aperture thereof whereby to communicate with the contacting chamber through said peripherally disposed apertures; gas feed means communicating separately with said gas passageway and said conduit whereby to maintain as a fluidized bed, and to coat, solids contained in the contacting chamber; means to supply coolant to said annular chamber; and means to heat said contacting chamber.

References Cited

UNITED STATES PATENTS

| | | | |
|---|---|---|---|
| 2,472,377 | 6/1949 | Keith | 23—288 X |
| 2,886,419 | 5/1959 | Orr et al. | 34—57 X |
| 3,053,642 | 9/1962 | Huntley et al. | 34—57 X |
| 3,074,777 | 1/1963 | Cortes | 23—288 X |
| 3,179,378 | 4/1965 | Zenz et al. | |

CHARLES A. WILLMUTH, *Primary Examiner.*